358-84. OR 3,524,015 SR

SEARCH ROOM

Aug. 11, 1970 J. O. CAMPBELL 3,524,015

RESPONSE SYSTEM FOR TELEVISION

Filed Aug. 31, 1966

INVENTOR:
JOHN O. CAMPBELL
BY *Elliott & Pastoriza*
ATTORNEYS.

United States Patent Office 3,524,015
Patented Aug. 11, 1970

3,524,015

RESPONSE SYSTEM FOR TELEVISION

John O. Campbell, 17631 Palora St., Encino, Calif. 91316

Filed Aug. 31, 1966, Ser. No. 576,394
Int. Cl. H04h 7/10
U.S. Cl. 178—6 15 Claims

ABSTRACT OF THE DISCLOSURE

A plurality of television receivers are connected to a common transmission line which supplies television program signals. Associated with each receiver is a means, under control of the viewer, for enabling the viewer to respond to queries from the program announcer. The responses are transmitted to a central location over the same transmission line where they are recorded. The response signals themselves may be either pulse-coded or voice signals. They may be generated by means of a switch or voice microphone used to amplitude modulate carrier signals unique to each receiver.

This invention relates to television systems and more particularly to a closed circuit television network in which one or more television receivers are connected to a common transmission means such as a coaxial cable for selective viewing of special programs.

In television programming generally and in closed circuit television programming particularly, it would be very desirable to provide some means for determining, on an individual basis, a viewer's reaction to a particular program or his response to particular queries by an announcer on the program. For example, in various marketing situations, a television announcer could ask the viewers to express their intent to purchase a given product shown for sale on the television screen. The provision of means for recording or otherwise receiving an immediate response from all of the various viewers would be invaluable to the sponsor of the television program. In other instances, audience surveys could be conducted and the various viewers in the audience asked to indicate their preference with respect to particular programs.

In the case of educational closed circuit television programs, a student's response to quiz questions transmitted over the television network to private homes could be received and graded during the actual time that the program was in progress all to the benefit of the student's learning process. Various other uses for such a system wherein a viewer may indicate immediately his reaction or response to the program or announcer will be apparent.

With the foregoing considerations in mind, it is a primary object of the present invention to provide a television system in which individual viewers may indicate their reaction or response to a television program or query on a television program all to the end that the various advantages and uses as outlined above can be realized.

More particularly, it is an object to provide a closed circuit television system incorporating a means for enabling a viewer to indicate his reaction or response to a television program without appreciably increasing the cost or equipment normally provided in closed circuit television systems in which automatic billing for pay television programs is carried out.

Briefly, these and many other objects and advantages of this invention are attained by providing response systems respectively associated with individual television receivers capable of providing a response signal at the will of the viewer of the television set on the same transmission line or means employed for receiving the program signals passed to the receiving set from the television transmitter or program source. A suitable analyzing and recording means remote from the receiver is coupled to the transmission line and arranged to selectively distinguish the response signals from each other.

In accord with a preferred embodiment of the invention, the response system is employed with a closed circuit television network wherein there is already provided a selector means associated with each receiver for providing an identifying signal on the transmission line to indicate to the programmer whether or not a particular program is being watched and which particular television set is receiving the program. The identification signal is normally used for billing purposes. The desired response signal to indicate a viewer's reaction to a program in this preferred embodiment is provided by altering the identification signal itself in a prescribed manner such that the same identification signal employed for billing or other purposes may be used for indicating a viewer's reaction. With this latter arrangement, very little modification or added expense or equipment is necessary to adapt the response system to already available closed circuit television networks.

A better understanding of the invention will be had by now referring to preferred embodiments thereof as illustrated in the accompanying drawings, in which.

Figure 1:
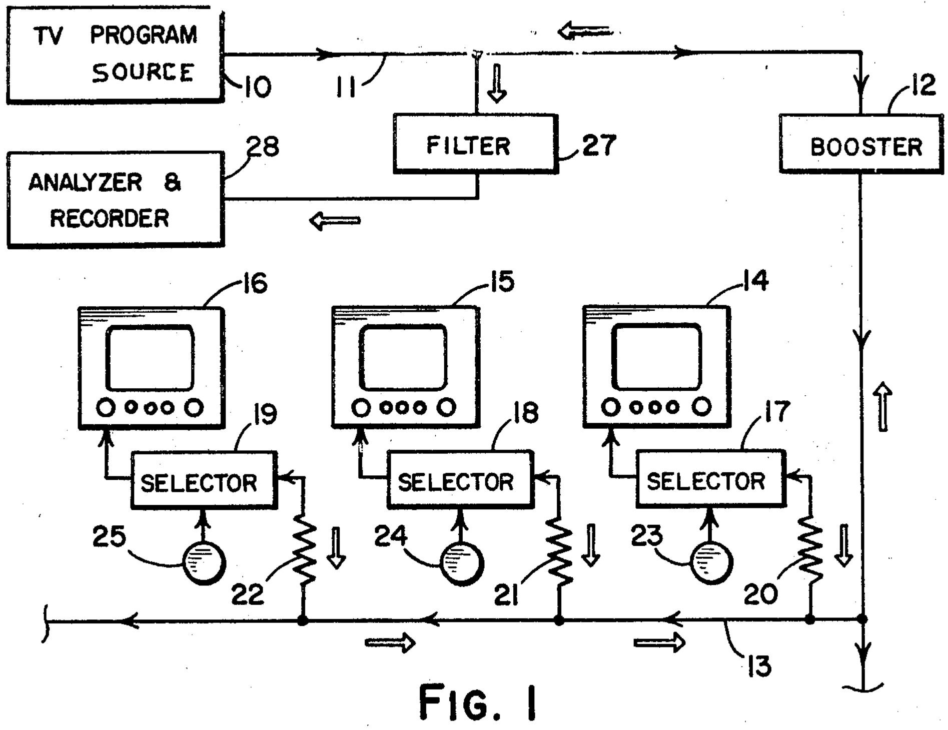
FIG. 1 is a block diagram of one type of closed circuit television system wherein automatic means for billing customers for particular programs is provided together with the novel response system of this invention.

Referring first to FIG. 1 there is shown a source of one or more television programs 10 arranged to transmit the programs on a common transmission means 11 such as a coaxial cable. Suitable boosters such as the booster 12 for amplifying the signals on the line 11 may be provided. At various points along the line 11, there are tapped off distribution coaxial cables such as indicated at 13 for feeding a plurality of television receiver such as indicated at 14, 15, and 16.

In accord with one type of closed circuit television system, automatic means are provided for facilitating the billing of various customers in accordance with the particular programs they are viewing. This means takes the form of selector means such as indicated at 17, 18, and 19 receiving the television program signals from the distribution line 13 through isolating resistances 20, 21 and 22 respectively.

In the operation of the system described thus far, when a particular television program is being viewed by a particular customer, the associated selector means functions to generate and apply an identifying signal back through the associated isolating resistance to the distribution line 13. This identification signal serves to identify the particular television set being operated and particular program being watched by the viewer. This signal is separated from the transmission line 11 by means of a filter 27 and passed into an analyzer and recorder 28 which will provide a record of the time duration of operation of any one of the various television receivers and the particular program being watched for billing purposes.

To avoid interference with the television program signals which are indicated by the black arrows, the identification signals, indicated by the hollow arrows, are of frequencies different from the television program signal frequencies.

A more detailed description of the foregoing closed circuit system is set forth in U.S. Pat. 3,255,306 issued June 7, 1966, and entitled Closed-Circuit Television Network.

In accordance with the preferred embodiment of the present invention, a response signaling system takes advantage of the already available components for providing identification signals for billing purposes to indicate the audience reaction or an individual viewer's reaction or response to a particular program. In this respect, the identification signal is altered or modulated in a prescribed manner to provide a response signal under control of the operator. Towards this end, there are illustrated in FIG. 1 suitable response systems 23, 24, and 25 coupled to the various selector means 17, 18, and 19 respectively.

Figure 2:
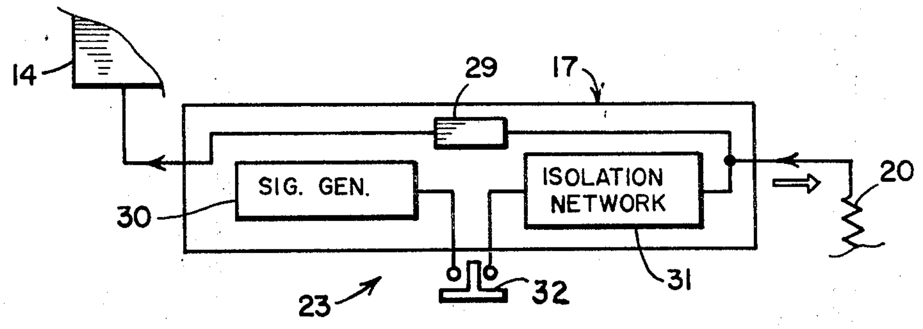
FIG. 2 is a schematic diagram of one type of response system usable with the network of FIG. 1; and, FIG. 3 shows an alternative type of response signal system usable with the network of FIG. 1.

Referring now to FIG. 2 there is shown in greater detail one form of response signaling means usable with the selector means 17 illustrated in FIG. 1. As shown in FIG. 2, the selector means 17 includes a suitable coupling network 29, under the control of the TV viewer, for passing the selected television program signals and only the signals for the selected program to the television receiving set 14. Also included is a signal generating means 30 which is under the control of the TV viewer and coupled to a suitable isolation network 31 for passing the identification signal back over the transmission line to the analyzer and recorder in FIG. 1. The signal generating means 30 and selective coupling means 29 are arranged to be selectively positioned when the TV viewer actuates selector 17 to select a particular TV program channel.

The frequency of the identifying signal provided by the signal generator means 30 is determined by the program selector. This identifying signal may be modified or altered in such a manner as to define a response signal under control of the viewer of the set.

One response system for effecting this alteration is shown in FIG. 2 as constituting a control means in the form of a switch 32, which is normally closed but may be actuated by the TV viewer, cooperating with a response signal means in the form of simple electric contacts connected into the particular conductor line passing the identification signal from the signal generator 30 to the isolation network 31. An electronic switch could be used for this application also. It is apparent that the switch should be arranged so that it could not be held in the open position indefinitely (i.e. upon being actuated it would open for a brief time, say a second or less, and then automatically close). Methods of doing this are simple, straightforward and well known.

In the operation of the circuit of FIG. 2, assume that a television announcer asks a specific question; for example, "would you buy this particular product?" The viewer could then respond by actuating the switch 32 a prescribed number of times which would provide an interruption in the identification signal passed to the analyzer and recorder 28 of FIG. 1. For example, the prescribed manner of operation might constitute a code such as a double interruption indicating a "yes" answer and a single interruption indicating a "no" answer. Alteratively, other prescribed coding may be employed to provide more complete responses. In fact, it will be evident that a simple Morse code may be transmitted back over the transmission line by means of the switch 32.

Figure 3:
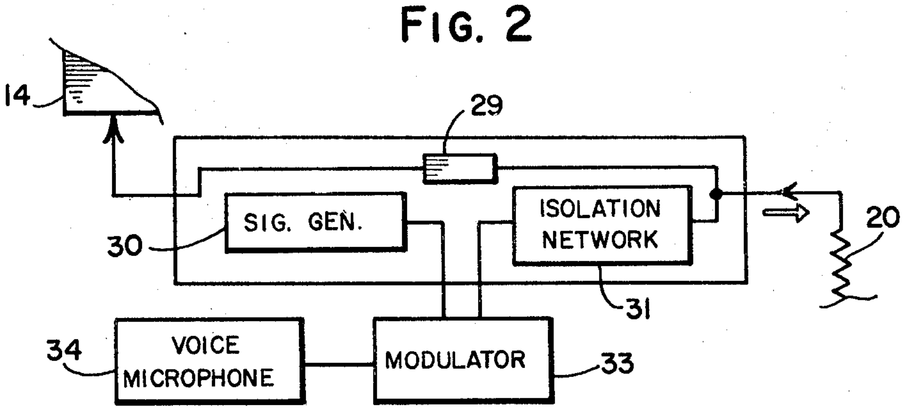

Referring now to FIG. 3 there is shown another type of response system wherein again the identification signal from the signal generating means 30 to the isolation network 31 is employed as a carrier. In the embodiment of FIG. 3, the response signal means constitutes a modulator 33 connected into the conductor line carrying the identification signal and the control means is in the form of a voice microphone 34. In operation, the viewer may actually speak into the voice microphone to modulate the identification signal by the modulator 33. By providing a suitable de-modulating network in the analyzer and recorder arrangement 28 of FIG. 1, the viewer may actually talk to the person on the television screen conducting a quiz or other program.

From the foregoing description, it will be evident that the present invention has provided a simple and economical means of enabling a viewer to indicate his reaction to a particular program or to answer particular queries set forth on a program without appreciably modifying or increasing the cost of certain types of presently available closed circuit television systems incorporating identification signals for billing or other purposes.

It will be evident from the description set forth that a plurality of individual receiving sets such as indicated by the additional sets 15 and 16 may also be modified such that their particular identification signals may be modulated to define a response signal. Since the identification signals are peculiar to each particular receiving set, a person at the remote location of the analyzer and recorder circuit 28 will know which particular viewer is providing a response signal even though the modulation of the carrier may be identical. This is because the carrier itself is of a distinct frequency for identifying the particular set as well as the particular program selected.

Further modifications of the basic concept of modulating the identifying signal to define a response signal will occur to those skilled in the art. The invention therefore is not thought of as limited to the particular embodiments set forth merely for illustrative purposes.

What is claimed is:

1. A response system for television wherein there is provided a source of a plurality of different television program signals, a plurality of television receivers, a common transmission means for passing said program signals from said source to said receivers, a selector means coupled to each television receiver for generating and applying an identification signal for that receiver to said common transmission means, and an analyzer means connected to receive said identification signal, said response system including: control means for each receiver adapted to be operated by the viewer; and response signal means coupled to the associated selector means and said control means for providing a response signal on said common transmission line for reception in said analyzer means whenever said control means is operated by said viewer, whereby a viewer may indicate his reaction to a program being viewed by operating said control means.

2. A system according to claim 1, in which said identification signal functions as a carrier for said response signal.

3. A system according to claim 2, in which said control means comprises a switch means, said response signal means effecting interruption of said identification signal upon operation of said switch means.

4. A system according to claim 2, in which said control means comprises a microphone and said response signal means constitutes a modulator for modulating said identification signal in accord with voice sounds received in said microphone to thereby define said response signal.

5. A closed circuit television response system comprising, in combination: a source of a plurality of different television program signals; a plurality of television receivers; a common transmission line for passing said program signals from said source to said receivers; selector means coupled to each of said television receivers for generating and applying identification signals for the receivers to said transmission line; an analyzer means coupled to said transmission line at a point remote from the receivers for receiving said identification signals; and a control system adapted to be operated at the will of any one person viewing any one of the television receivers, coupled to the selector means associated with the receiver for altering the identification signal for that receiver upon operation by the viewer to provide response information to said analyzer in addition to identifying information, whereby a viewer may indicate his reaction to a selected one of said program signals being viewed by operating said control system.

6. A response system according to claim 5, in which said control system includes a manually operable switch means connected to said selector means in a manner to enable interruption of said identifying signal.

7. A response system according to claim 5, in which said control system includes a voice microphone and modulator connected to said selector means to enable modulation of said identifying signal by voice sounds.

8. A closed circuit television response system suitable for audience survey in which a number of receivers are connected to a common transmission line to which can be supplied a number of television program signals and in which each receiver has a program selector and a generator of coded signals identifying the particular receiver selected, means for modifying the coded identification signals at the will of the television viewer; and means for applying the modified identification signals from the receiver to the transmission line for transmission to a common analyzing station.

9. A system according to claim 8, in which said modifying means comprises a switch.

10. A system according to claim 8, in which said modifying means comprises a microphone and modulator.

11. A television response system comprising: a common transmission line supplying a plurality of different television program signals; a plurality of television receivers connected to said common transmission line; and a response means associated with each receiver for delivering to said transmission line response signals indicating the particular receiver being viewed and the viewer's response to the particular one of said plurality of different television program signals being viewed.

12. A system according to claim 11, including analyzing means connected to said transmission line for receiving said response signals.

13. A system according to claim 11, in which said response signals are generated by a switch.

14. A system according to claim 11, in which said response signals are generated by a voice microphone.

15. A system according to claim 12, in which said response signals are used to modulate carrier signals unique to each receiver such that they may be simultaneously received in said analyzing means from all said receivers connected to said transmission line.

References Cited

UNITED STATES PATENTS

| | | | |
|---|---|---|---|
| 3,188,384 | 6/1965 | Townsend | 178—6 |
| 3,255,306 | 6/1966 | Campbell et al. | 178—6 |
| 3,054,858 | 9/1962 | Reid | 340—202 |

FOREIGN PATENTS

| | | |
|---|---|---|
| 667,010 | 7/1963 | Canada. |

RICHARD MURRAY, Primary Examiner

B. L. LEIBOWITZ, Assistant Examiner

U.S. Cl. X.R.

340—202